United States Patent
Ku et al.

(10) Patent No.: US 10,313,300 B2
(45) Date of Patent: Jun. 4, 2019

(54) METHOD AND APPARATUS FOR INTERCARRIER COMMUNICATION

(71) Applicant: AT&T INTELLECTUAL PROPERTY I, L.P., Atlanta, GA (US)

(72) Inventors: Bernard S. Ku, Austin, TX (US); Lakshminarashimhan Naidu, Pearland, TX (US); James W. Forsyth, Royal Oak, MI (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 543 days.

(21) Appl. No.: 15/051,212

(22) Filed: Feb. 23, 2016

(65) Prior Publication Data

US 2017/0244663 A1    Aug. 24, 2017

(51) Int. Cl.
*H04L 29/12* (2006.01)
*H04M 7/00* (2006.01)
*H04M 7/12* (2006.01)

(52) U.S. Cl.
CPC ........ *H04L 61/1511* (2013.01); *H04L 61/157* (2013.01); *H04L 61/605* (2013.01); *H04M 7/0075* (2013.01); *H04M 7/128* (2013.01)

(58) Field of Classification Search
CPC . H04L 61/106; H04L 61/1511; H04L 61/157; H04L 61/605; H04M 7/006; H04M 7/0075; H04M 7/128
See application file for complete search history.

(56) References Cited

U.S. PATENT DOCUMENTS

| 8,184,798 | B2 | 5/2012 | Wiatrowski et al. |
| 8,244,905 | B2 | 8/2012 | Bhatt et al. |
| 8,537,993 | B2 | 9/2013 | Dwight et al. |
| 8,571,015 | B2 | 10/2013 | Ku |
| 8,638,780 | B1 | 1/2014 | Zhang |

(Continued)

OTHER PUBLICATIONS

"Operating in Two Worlds: Routing Plan Management for VoIP/PSTN Compatibility", www.nakumalik.com, Mar. 2, 2007 http://www.nakulmalik.com/pdf/Operating_In_Two_Worlds_Routing_Plan_Management for_VoIP-PSTN_Compatibility.pdf.

(Continued)

*Primary Examiner* — Michael Thier
*Assistant Examiner* — Brian P Cox
(74) *Attorney, Agent, or Firm* — Toler Law Group, PC

(57) ABSTRACT

A method includes receiving, at a network component of a first carrier network from a source device, a telephone number of a destination device configured to communicate via a second carrier network. The method further includes in response to a query message sent to a telephone number mapping device of an internetwork packet exchange network, receiving a name server record at the network component, the name server record indicating a domain name associated with a second telephone number mapping device of the second carrier network. The method also includes in response to the network component sending the domain name to a domain name server of the internetwork packet exchange network, receiving an Internet protocol address of the second telephone number mapping device. The method includes sending, from the network component to the second telephone number device, a second query message based on the Internet protocol address.

20 Claims, 5 Drawing Sheets

(56) References Cited

U.S. PATENT DOCUMENTS

| | | |
|---|---|---|
| 8,718,048 B2 | 5/2014 | Ku |
| 8,792,481 B2 | 7/2014 | Ku |
| 8,879,442 B2 | 11/2014 | Ku |
| 9,071,468 B2 | 6/2015 | Forsyth et al. |
| 9,124,603 B2 | 9/2015 | Jackson et al. |
| 9,237,173 B2 | 1/2016 | Ku et al. |
| 2007/0165613 A1* | 7/2007 | Soo ................ H04L 29/06027 370/356 |
| 2010/0157977 A1* | 6/2010 | Ku ................ H04L 29/1216 370/352 |
| 2012/0300768 A1 | 11/2012 | Huang et al. |
| 2016/0248814 A1* | 8/2016 | Mufti ................ H04L 65/1006 |

OTHER PUBLICATIONS

Lim, J., et al., "Operational Requirements for ENUM-Based Softswitch Use. No. RFC 5346", 2008, https://tools.ietf.org/html/rfc5346.
Risley, Chris, "The Long View on ENUM", www.tmcnet.com, Nov. 2006, http://www.tmcnet.com/voip/1106/featurearticle--long-view-on-enum.htm.

\* cited by examiner

METHOD AND APPARATUS FOR INTERCARRIER COMMUNICATION

FIELD OF THE DISCLOSURE

The present disclosure is generally related to intercarrier communication.

BACKGROUND

Telecommunications systems provide consumers with telephony services that enable client devices to access a large variety of content. Consumers are not bound to specific locations when communicating with others, or when accessing multimedia content or resources available via the Internet. To enable consumers to communicate and access multimedia resources, network service providers and other service providers may support internet-based calls, access and execute software services or software applications, make requests for various types of content, and perform a variety of other tasks and functions. In order to handle large volumes of requests for content from user devices, service providers often use content delivery networks that enable content to be provided in an efficient manner.

While network technologies provide substantial benefits to consumers, there is still a significant opportunity to enhance methodologies and technologies for performing intercarrier communication. For example, telecommunications carriers and their accompanying networks typically operate independently of other telecommunication carriers (and the other telecommunication carriers' accompanying networks). Accordingly, subscribers from one carrier may not be able to partake in Internet protocol (IP) to IP services with subscribers from another carrier. To illustrate, if a first carrier cannot determine an IP address of a destination device (served by a second carrier) that is a target of an IP call session, then the first carrier may be forced to complete the call using a non-IP connection, such as a public switched telephone network (PSTN) or a cellular 2G or 3G connection. While this form of call completion enables voice communications, advantages (e.g., data rate, cost of calling session, rich IP data) of an IP connection are lost.

DETAILED DESCRIPTION

Figure 1:
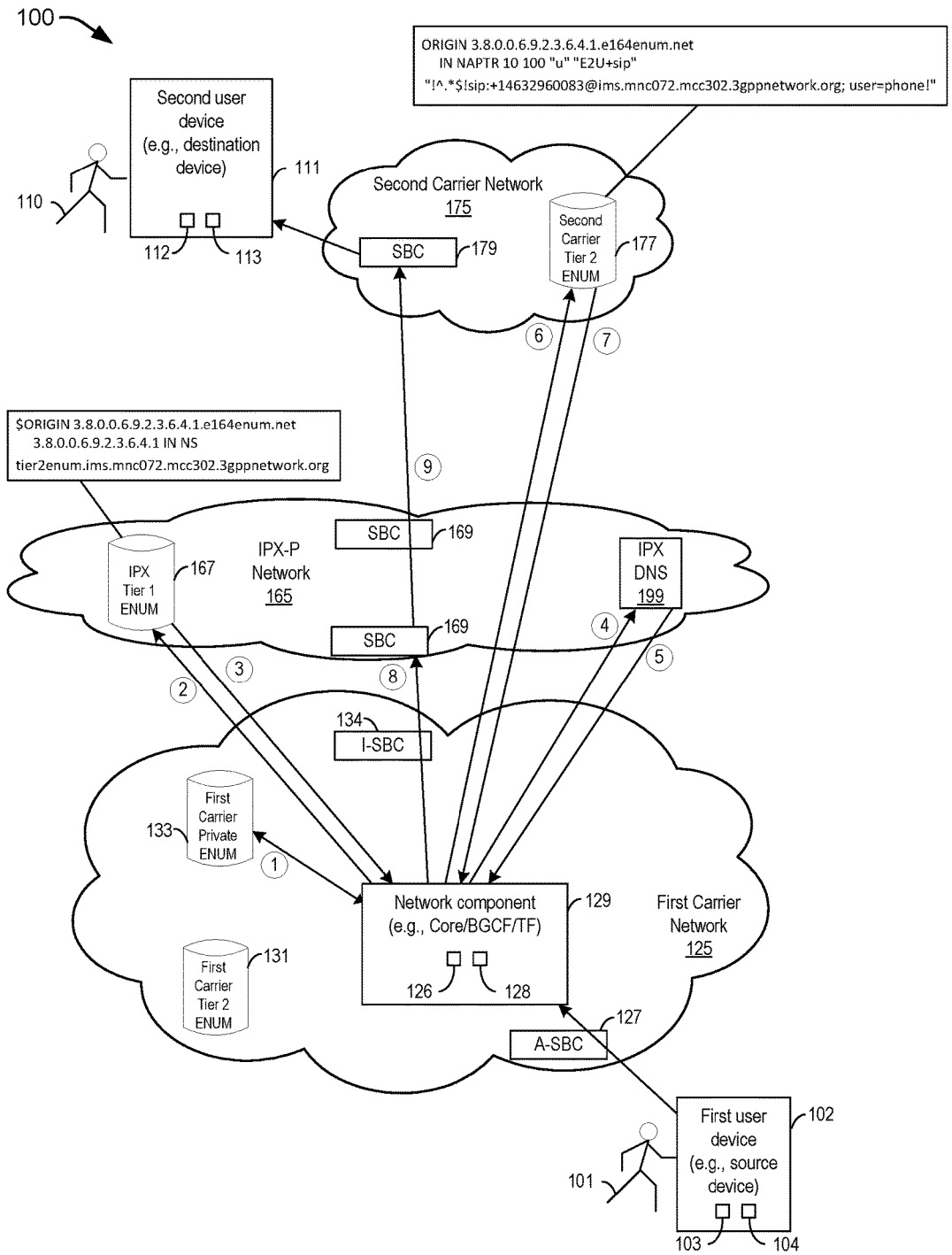
FIG. 1 is a schematic diagram illustrating a particular example of a system for enabling intercarrier communication.

The present disclosure describes, among other things, illustrative examples for enabling Internet protocol (IP) carrier peering. In particular, the present disclosure describes an architecture and method to provide carrier telephone number mapping (ENUM) based routing to enable a first carrier network (e.g., a first Internet protocol (IP) carrier network) to locate and connect to a second carrier network (e.g., a second IP carrier network) for purposes of conducting IP call sessions, such as for voice-over-IP (VoIP) calls. For example, the architecture(s) and method(s) described herein may enable telephone number mapping (ENUM) based routing by the first carrier network to locate and connect to a subscriber device of the second carrier network.

A first carrier network may receive an outbound Internet protocol (IP) call from a first user device, such as a source device, of a first carrier (associated with a first carrier network). The outbound IP call may be destined for a second user device, such as a destination device, associated with a second carrier (associated with a second carrier network). To illustrate, a network component, such as an Internet protocol multimedia subsystem (IMS) core device (e.g., a servicing-call session control function (S-CSCF)), of the first carrier network may receive an outbound IP call that includes or indicates a telephone number of the second user device. In some implementations, the network component may include or may be coupled to a breakout gateway control function (BGCF) or a transit function (TF) that is associated with the first carrier network.

The network component may query a private ENUM of the first carrier network using a domain (e.g., "e164.arpa") of the first carrier to obtain a record corresponding to the second user device associated with the second carrier. If the private ENUM of the first carrier network indicates to the network component that private ENUM could not identify a record responsive to the query, the network component may send a query message to an internetwork packet exchange network. The query message may include the telephone number (or a version thereof, such as reverse version of the telephone number) having an intercarrier ENUM apex domain, such as "e164enum.net", as an illustrative, non-limiting example. For example, the first carrier network may send the query message to a first ENUM (e.g., a Tier 1 ENUM) of the internetwork packet exchange network. The internetwork packet exchange network (e.g., the first ENUM) maintains name server (NS) record(s) of Tier 2 ENUMs of multiple carrier providers, such as a first carrier provider of the first carrier network and a second carrier provider of the second carrier network.

In response to the query message sent to the first ENUM of the internetwork packet exchange network, the network component (e.g., the BGCF/TF) may receive a NS record indicating a domain name (DN) associated with a second ENUM (e.g., a Tier 2 ENUM) of the second carrier network. After receiving the NS record, the first network component may determine the DN and may send the DN to a domain name server (DNS) of the internetwork packet exchange network. In response to sending the DN to the DNS device of the internetwork packet exchange network, the network component receives an Internet protocol address of the second ENUM that is hosted at the second carrier communications network.

The network component may send a second query message to the second ENUM of the second carrier based on the Internet protocol address. For example, the network component may send the second query to the Internet protocol address of the second ENUM. In some implementations, the second query may include the telephone number having the intercarrier ENUM apex domain. In response to the second query, the second ENUM may send a name authority pointer (NAPTR) record to the network component. The NAPTR record may include a gateway uniform resource identifier (URI) that identifies or indicates a component (e.g., a device) of the second carrier network that may accept calls from the first carrier network. For example, the NAPTR may indicate an IP address of a device, such as a session border control (SBC) device, of the second carrier network that may accept IP calls from the first carrier network.

The network component may forward call processing of the outbound IP call from the first carrier network to the second carrier network based on the NAPTR record and the gateway URI. To illustrate, the network component may route the outbound IP call to the SBC device (of the second carrier network) via the internetwork packet exchange network. As a result, the second carrier network may receive and route the outbound IP call to the desired second user device (e.g., the destination device) to complete the IP outbound call (e.g., establish an IP call session between the first user device and the second user device). Notably, the systems and methods do not require the need for intervention of a private ENUM of the first carrier network to forward to the first ENUM (of the internetwork packet exchange network), thus allowing the network component to control management (including messaging of) establishing an IP call. This may result in dramatically improved and timely call termination.

In a particular illustrative aspect, an apparatus includes a memory that stores instructions, such as executable instructions, and a processor coupled to the memory. For example, the processor may be communicatively coupled to the memory. The processor is configured to execute the instructions to cause the processor to perform operations to receive, at a network component of a first carrier network from a source device, a telephone number of a destination device configured to communicate via a second carrier network. The instructions further cause the processor to perform operations to, in response to a query message based on the telephone number sent from the network component to a telephone number mapping device of an internetwork packet exchange network, receive a name server record at the network component, the name server record indicating a domain name associated with a second telephone number mapping device of the second carrier network. The instructions also cause the processor to perform operations to, in response the domain name being sent from the network component to a domain name server of the internetwork packet exchange network, receive an Internet protocol address of the second telephone number mapping device. The instructions cause the processor to perform operations to send, from the network component to the second telephone number mapping device, a second query message based on the Internet protocol address.

In another illustrative aspect, a method includes receiving, at a network component of a first carrier network from a source device, a telephone number of a destination device configured to communicate via a second carrier network. The method further includes in response to the network component sending a query message based on the telephone number to a telephone number mapping device of an internetwork packet exchange network, receiving a name server record at the network component, the name server record indicating a domain name associated with a second telephone number mapping device of the second carrier network. The method also includes in response to the network component sending the domain name to a domain name server of the internetwork packet exchange network, receiving an Internet protocol address of the second telephone number mapping device. The method includes sending, from the network component to the second telephone number mapping device, a second query message based on the Internet protocol address.

In another illustrative aspect, a computer readable storage device stores instructions executable by a processor to perform operations including receiving, at a network component of a first carrier network from a source device, a telephone number of a destination device configured to communicate via a second carrier network. The operations also include, in response to the network component sending a query message based on the telephone number to a telephone number mapping device of an internetwork packet exchange network, receiving a name server record at the network component, the name server record indicating a domain name associated with a second telephone number mapping device of the second carrier network. The operations further include, in response to the network component sending the domain name to a domain name service device of the internetwork packet exchange network, receiving an Internet protocol address of the second telephone number mapping device. The operations include sending, from the network component to the second telephone number mapping device, a second query message based on the Internet protocol address.

Figure 2:
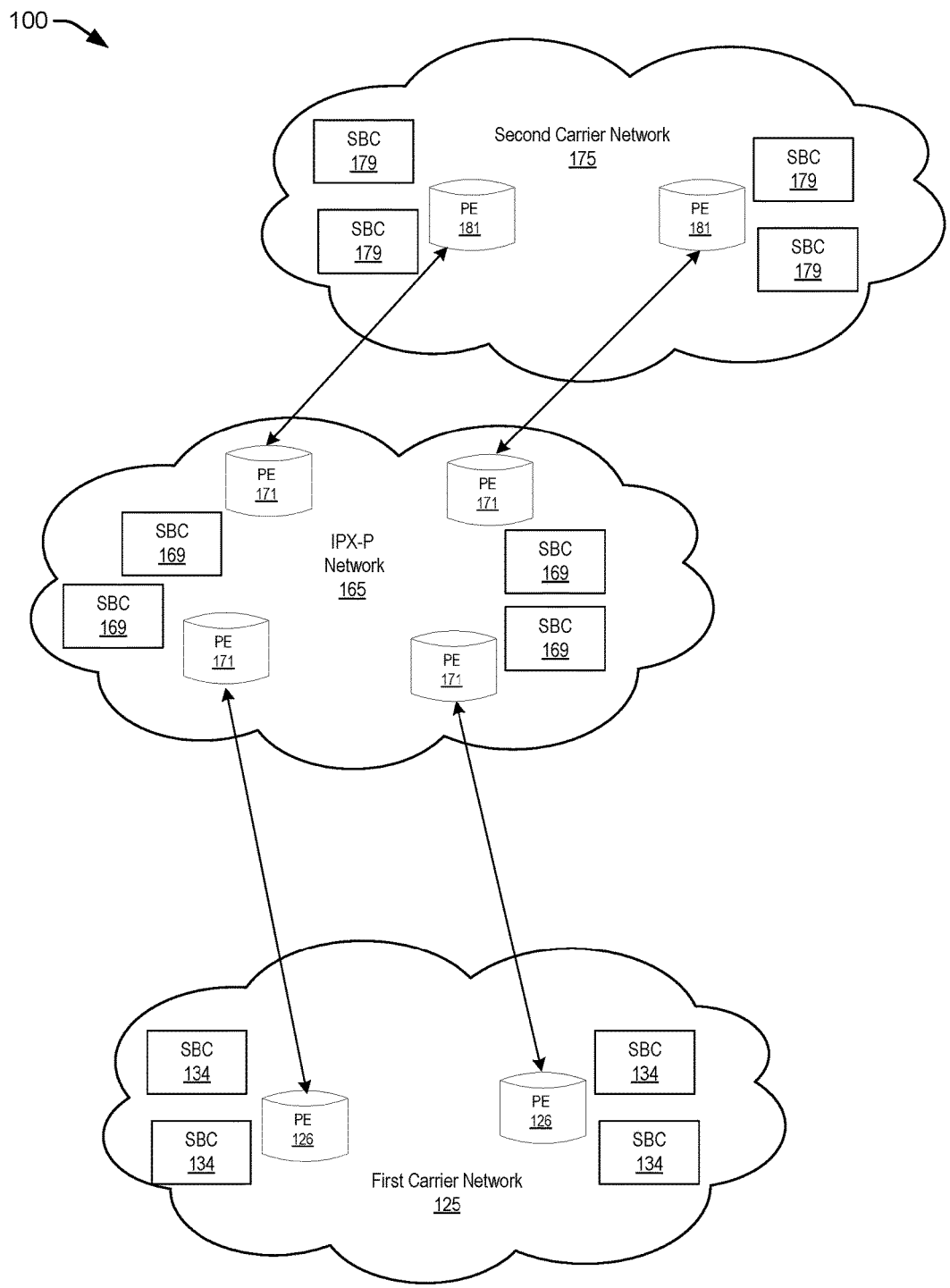
FIG. 2 is a schematic diagram illustrating an example of an internetwork packet exchange (IPX) interconnection between a first carrier network, an internetwork packet exchange partner (IPX-P) network, and a second carrier network.

Referring to FIG. 1, a system 100 is depicted that illustrates an example system for providing an architecture for enabling Internet protocol (IP) carrier peering. In particular, the system 100 and methods may provide mechanisms for providing intercarrier communication. For example, the system 100 may enable carrier ENUM-based routing for subscribers of a first carrier to locate and connect with subscribers of another IP peering carrier. The system 100 may be configured to support, but is not limited to supporting, content delivery services, cloud computing services, IP multimedia subsystem (IMS) services, satellite services, telephone services, voice-over-internet protocol services (VoIP), voice-over-long-term-evolution (VoLTE) services, software as a service (SaaS) applications, gaming applications and services, productivity applications and services, mobile applications and services, and any other computing applications and services. Additional aspects of the system 100 are depicted in FIG. 2.

The system 100 includes a first carrier network 125, an IPX-P network 165, and a second carrier network 175. The system 100 may also include a first user 101, who may utilize a first user device 102, and a second user 110, who may utilize a second user device 111. For example, the first user 101 may utilize the first user device 102 to access data, content, and services, or to perform a variety of other tasks and functions. As an example, the first user 101 may utilize first user device 102 to transmit signals to access various online services and content, such as those provided by a content provider or service provider associated with first carrier network 125. As another example, the first user 101 may utilize first user device 102 to make one or more IP-based calls (or other types of calls) to subscribers of the first carrier, subscribers of a second carrier, or to subscribers of any other carrier. The first user 101 may be a subscriber of a first carrier that may operate and control first carrier network 125. The first user device 102 may include a memory 103 that includes instructions, and a processor 104 that executes the instructions from the memory 103 to perform the various operations that are performed by the first user device 102. In some implementations, the processor 104 may be hardware, software, or a combination thereof. The first user device 102 may be a computer, a laptop, a tablet device, a phablet, a server, a mobile device, a smartphone, a smart watch, or any other type of computing device, as illustrative, non-limiting examples.

The second user device 111 may be utilized by the second user 110 to transmit signals to request various types of content, services, and data provided by content and service providers associated with the second carrier network 175 or any other network in the system 100. Also, the second user 110 may utilize the second user device 111 to make one or more IP-based calls (or other types of calls) to subscribers of the second carrier, subscribers of the first carrier, or subscribers of any other carrier. The second user 110 may be a subscriber of the second carrier that may control and operate second carrier network 175. The second user device 111 may include a memory 112 that includes instructions, and a processor 113 that executes the instructions from the memory 112 to perform the various operations that are performed by the second user device 111. In certain some implementations, the processor 113 may be hardware, software, or a combination thereof. The second user device 111 may be a computer, a laptop, a tablet device, a phablet, a server, a mobile device, a smartphone, a smart watch, or any other type of computing device, as illustrative, non-limiting examples.

In some implementations, the first user device 102 and the second user device 111 may have any number of software applications and/or application services stored and/or accessible thereon. For example, the first and second user devices 102, 111 may include cloud-based applications, VoIP applications, other types of phone-based applications, media streaming applications, content-based applications, media-editing applications, database applications, gaming applications, internet-based applications, browser applications, mobile applications, service-based applications, productivity applications, video applications, music applications, social media applications, any other type of applications, any types of application services, or a combination thereof, as illustrative, non-limiting examples. Additionally or alternatively, the software applications and services may include one or more graphical user interfaces so as to enable the first and second users 101, 110 to readily interact with the software applications. The software applications and services may also be utilized by the first and second users 101, 110 to interact with the any device in the system 100, any network in the system 100, or any combination thereof. In some implementations, the first user device 102 and the second user device 111 may include associated telephone numbers, device identities, or any other identifiers to uniquely identify the first and second user devices 102, 111.

The first carrier network 125 (e.g., a first carrier communications network) may be configured to link each of the devices in the system 100 to one another. For example, the first carrier network 125 may be utilized by the first user device 102 to connect with other devices within or outside first carrier network 125. Additionally, the first carrier network 125 may be configured to transmit, generate, and receive any information and data traversing the system 100. In some implementations, the first carrier network 125 may include any number of servers, databases, or other componentry. The first carrier network 125 may also include and be connected to a cloud-computing network, an IMS network, a VoIP network, a VoLTE network, a wireless network, an Ethernet network, a satellite network, a broadband network, a cellular network, a private network, a cable network, the Internet, an internet protocol network, a multiprotocol label switching (MPLS) network, a content distribution network, any network, or any combination thereof. In some implementations, the first carrier network 125 may be part of a single autonomous system that is located in a particular geographic region, or be part of multiple autonomous systems that span several geographic regions.

The first carrier network 125 may include a series of components to facilitate communications and the functions of the first carrier network 125. For example, the first carrier network 125 may include an access-session border controller (A-SBC) 127, a network component 129, a first carrier Tier 2 telephone number mapping (ENUM) 131, a first carrier private ENUM 133, and an interconnect-session border controller (I-SBC) 134. The A-SBC 127 may be configured to perform any of the functions of a traditional access session border controller. For example, the A-SBC 127 may reside at a border of the first carrier network 125 and may be the device via which the first user device 102 may access the network component 129, such as an Internet protocol multimedia subsystem (IMS) core, when making an IP-based call. An ENUM may include a device (e.g., a component) of a particular network or a group of devices of the particular network. For example, a particular ENUM may include a computer, a processor and a memory, a server, at least one database, or a combination thereof, as illustrative, non-limiting examples. In some implementations, an ENUM, such as a server, of a particular network may be configured to access a database that is included in the particular network, a database that is remote to the particular network, or both.

The network component 129 may be configured to perform any of the functions of a traditional IMS core (e.g., a servicing-call session control function (S-CSCF)). Additionally or alternatively, the network component 129 may include a BGCF/TF. The network component 129 may include a memory 126 that includes instructions, and a processor 128 coupled to the memory 126. The processor 128 may be configured to execute the instructions to perform various operations described with reference to the network component 129. The processor 128 may be hardware, software, or a combination thereof. In some implementations, the network component 129 may include multiple processors coupled to the memory 126 and configured to execute the instructions stored at the memory 126.

The private ENUM 133 that may conform to the E.164 ENUM standard. The private ENUM 133 may also include any of the functions and features of a traditional private ENUM and may be private to the first carrier network 125. The Tier 2 ENUM 131 that may include any of the functionality of a traditional Tier 2 ENUM. The private ENUM 133 and Tier 2 ENUM 131 may contain DNS records and may utilize the DNS records to translate telephone numbers into a URI or IP address that may be utilized in IP-based communications. The I-SBC 134 that may include any of the functions and features of a traditional I-SBC. For example, the I-SBC 134 may reside at a boundary of the first carrier network 125 where different networks (e.g., IXP-P network 165 and/or second carrier network 175) may interconnect or peer with the first carrier network 125. Moreover, the first carrier network 125 may include any number of provider edge devices 126 (e.g., routers) that may be utilized to connect the first carrier network 125 to the other networks in the system 100, as depicted with reference to FIG. 2.

The IPX-P network 165 may be configured to link each of the devices and/or networks in the system 100 to one another, and may include any of the functionality of an internetwork packet exchange network. The IPX-P network 165 (e.g., internetwork packet exchange network) may be a partner network of the first carrier network 125 and/or a partner network of the second carrier network 175. Additionally, the IPX-P network 165 may be configured to transmit, generate, and receive any information and data traversing the system 100. In some implementations, the IPX-P network 165 may include any number of servers, databases, or other componentry. The IPX-P network 165 may also include and be connected to a cloud-computing network, an IMS network, a VoIP network, a VoLTE network, a wireless network, an Ethernet network, a satellite network, a broadband network, a cellular network, a private network, a cable network, the Internet, an internet protocol network, a MPLS network, a content distribution network, any other network, or any combination thereof, as illustrative, non-limiting examples. In some implementations, the IPX-P network 165 may be part of a single autonomous system that is located in a particular geographic region, or be part of multiple autonomous systems that span several geographic regions.

The IPX-P network 165 may include a series of session border controllers (SBCs) 169, an IPX Tier 1 ENUM 167, and an IPX domain name server (DNS) 199. The IPX-P network 165 may utilize the SBCs 169 to exert control over signaling associated with communications, such as calls, traversing through the IPX-P network 165, and may include any functionality associated with a session border controller. The IPX-P network 165 may further include an IPX Tier 1 ENUM 167 that may include any of the functionality of a traditional Tier 1 ENUM and may be a higher tiered ENUM as compared to other ENUMs in the system 100. The IPX Tier 1 ENUM 167 may store name server records including information and IP addresses for Tier 2 ENUMs 131, 177 of networks that are partnered with the IPX-P network 165. For example, the IPX Tier 1 ENUM may include IP address information and pointers to the Tier 2 ENUM 131 of the first carrier and the Tier 2 ENUM 177 of the second carrier. In some implementations, the IPX Tier 1 ENUM 167 may store name server records and pointers for other types of ENUMs and/or for any type of devices in other partner networks.

The IPX DNS 199 can include DNS records for use in converting URI addresses into IP addresses. The IPX DNS 199 can include DNS records for use in converting URI addresses into IP addresses. In one embodiment, the network component 129 can query the IPX DNS 199 of the IPX-P network 165, using a URI address that it has obtained for a second carrier Tier 2 ENUM 177. The IPX DNS 199 can resolve the URI address to the correct IP address so that the network component 129 can query the second carrier Tier 2 ENUM 177. Moreover, the IPX-P network 165 may include any number of provider edge devices 171 (e.g., routers) that may be utilized to connect the IPX-P network 165 to the other networks in the system 100, as depicted with reference to FIG. 2.

The second carrier network 175 (e.g., a second carrier communications network) of the system 100 may be configured to link each of the devices in the system 100 to one another. For example, the second carrier network 175 may be utilized by the second user device 111 to connect with other devices within or outside second carrier network 175. Additionally, the second carrier network 175 may be configured to transmit, generate, and receive any information and data traversing the system 100. In some implementations, the second carrier network 175 may include any number of servers, databases, or other componentry. The second carrier network 175 may also include and be connected to a cloud-computing network, an IMS network, a VoIP network, a VoLTE network, a wireless network, an Ethernet network, a satellite network, a broadband network, a cellular network, a private network, a cable network, the Internet, an internet protocol network, a MPLS network, a content distribution network, any network, or any combination thereof, as illustrative, non-limiting examples. In some implementations, the second carrier network 175 may be part of a single autonomous system that is located in a particular geographic region, or be part of multiple autonomous systems that span several geographic regions.

The second carrier network 175 may include a series of components to facilitate communications and the functions of the second carrier network 175. In particular, the second carrier network 175 may include SBCs 179, which may include any of the functions of a traditional session border controller. For example, SBC 179 may reside at a border of the second carrier network 175 and may exert control over signaling associated with communications, such as calls, traversing through the second carrier network 175. The second carrier network 175 may also include a Tier 2 ENUM 177 that may include any of the functionality of a traditional Tier 2 ENUM. The tier 2 ENUM 177 may utilize DNS records to translate telephone numbers into a URI or IP address that may be utilized in IP-based communications. Moreover, the second carrier network 175 may include any number of provider edge devices 181 (e.g., routers) that may be utilized to connect the second carrier network 175 to the other networks in the system 100, as depicted with reference to FIG. 2.

During operation of the system 100, the first user 101 may transmit, by utilizing the first user device 102, a request to establish a call with second user 110, who is using the second user device 111. For example, the first user device 102 may initiate a call (e.g., IP-based call) intended for the second user 110. The call may be provided to the first carrier network 125 via the A-SBC 127 which may route the call to the network component 129 (e.g., the IMS core).

In response to receiving the call from the A-SBC 127, the network component 129 may query the private ENUM 133 of the first carrier for the called number (e.g., E-164 number) of the second user device 111 of the second carrier, as indicated by a first path (1). For example, the network component 129 may send a first query message (e.g., first query request) to the first carrier private ENUM 133. The query (e.g., the first query message) may include a domain associated with the first carrier, such as "e164.arpa", which may be the domain configured with the ENUM client, e.g., the network component 129. The query may include the called number appended as <reverse telephone number>0.1.e164.arpa, and may be sent to the private ENUM 133 as $ORIGIN 1.1.1.1.2.2.2.2.1.5.1.e164.arpa. If the second user device 111 was a subscriber of the first carrier, the private ENUM 133 would return a match and the IP to IP call may be completed within the first carrier network 125. Since, however, the second user device 111 is not a subscriber of the first carrier, the private ENUM 133 may not find the telephone entry associated with the called number, and may return a signal and/or notification to the network component 129 indicating that a "Record not Found" in "e164.arpa" via the return of first path (1).

In response to receiving the signal and/or notification, the network component 129 may provide (e.g., forward) the call to a BGCF/TF portion of the network component 129 per 3GPP IMS standards. In some implementations the IMS core and the BGCF/TF may be included in the same component (e.g., the same device). The network component 129 (e.g., the BGCF/TF) may then modify the first query message to generate a second query message that includes an intercarrier ENUM apex domain, such as "e164enum.net". For example, the second query message may include the called number appended as <reverse telephone number>0.1.e164enum.net, as an illustrative, non-limiting example. The first query message is modified to include the intercarrier ENUM apex domain so that the "e164.arpa" domain associated with the first carrier may be bypassed, and go to another DNS hierarchy to find the actual routing record belonging to the second carrier associated with the second user device 111. This may be accomplished by configuring an ENUM trigger that matches on the Session Initiation Protocol Server Trunk Groups coming from the servicing-call session control functions (S-CSCFs). The ENUM trigger may specify the alternate ENUM domain (e.g., "e164enum.net"). The network component 129 (e.g., the BGCF/TF) may send the modified query to the private ENUM 133 with the modified domain and may receive a DNS name server record configuration directing to the IP address of the IPX Tier 1 ENUM 167. The following provides an example illustration of such a DNS name server record directing to the IP address of the IPX Tier 1 ENUM 167:

Domain
walil01isc.walil.uvp.itn.attnet IN NS ns1-walil01isc.walil.uvp.itn.att.net
DNS authority servers
ns1-walil01isc.walil.uvp.itn.attnet IN AAAA 2001:1890:1001:220B::4
For e164enum.net
e164enum.net IN NS ns.foo.net
Tier 1 ENUM server.
ns.foo.net IN AAAA 2001:1890:1001:220B::4

Based on the DNS name server record configuration received, the network component 129 (e.g., the BGCF/TF) may fetch the IP address of the IPX Tier 1 ENUM 167. Once the IP address of the IPX Tier 1 ENUM 167 is fetched, the network component 129 (e.g., the BGCF/TF) may directly query the IPX Tier 1 ENUM 167 for the hosted name server records of the Tier 2 ENUM 177 of the second carrier using the modified query, as indicated by a second path (2). The IPX Tier 1 ENUM 167 of the IPX-P network 165 may serve as an IPX vendor that will host the name server records of the Tier 2 ENUM 131 of the first carrier and the Tier 2 ENUM 177 of the second carrier, another ENUM, as an illustrative, non-limiting example. An example of the modified query as depicted in FIG. 1 may be:

$ORIGIN 3.8.0.0.6.9.2.3.6.4.1.e164enum.net
3.8.0.0.6.9.2.3.6.4.1 IN NS
Tier2enum.ims.mnc072.mcc302.3gppnetwork.org,
where "mnc072.mcc302" may be an IMS 3GPP standard for depicting a specific carrier, such as the second carrier in this case. "mnc" may be associated with or indicate a mobile network code and "mcc" may be associated with or indicate a mobile country code. It is noted that there is no need for intervention of the private ENUM 133 to forward to the IPX Tier 1 ENUM 167 so that overall call flow may be managed by a single network component (e.g., the network component 129), which may result in improved and timely call termination.

In response to the modified ENUM query sent to the IPX Tier 1 ENUM, the IPX Tier 1 ENUM 167 may send a name server (NS) record indicating a domain name (DN) associated with a third ENUM (e.g., a Tier 2 ENUM) of the second carrier network 175 to the network component 129 (e.g., the BGCF/TF), as indicated by a third path (3). After receiving the NS record, the network component 129 (e.g., the BGCF/TF) may determine the DN and may send the DN to a domain name server (DNS) 199 of the IPX-P network 165, as indicated by a fourth path (4). In response to sending the DN sent to the DNS 199 of the IPX-P network 165, the network component 129 (e.g., the BGCF/TF) receives an Internet protocol address of a Tier 2 ENUM 177 that is hosted at the second carrier network 175, as indicated by a fifth path (5).

In some implementations, the IPX Tier 1 ENUM 167 may provide a DNS A record in response to the modified query sent by the network component 129. For example, in response to receiving the modified query, as indicated by the second path (2), the IPX Tier 1 ENUM 167 may send a DNS A record and the NS record of the third ENUM (e.g., a Tier 2 ENUM of the second carrier network 175), as indicated by the third path (3). To illustrate, the NS record and the A record of the third ENUM, such as the Tier 2 ENUM 177, may include:

Fully qualified domain name (FQDN) of second carrier Tier 2 ENUM server
tier2enum.ims.mnc072.mcc302.3gppnetwork.org NS ns.carrier1.net
IPv6 address of first carrier Tier 2 ENUM server
ns.carrier1.net IN A 2001:1890:1001:220B::4

In such implementations, the network component 129 (e.g., the BGCF/TF) may not need to determine the DN and may send the DN to a domain name server (DNS) 199 of the IPX-P network 165, as indicated by a fourth path (4). To illustrate, in response to the network component 129 receiving the NS record and the A record from the IPX Tier 1 ENUM 167, as indicated by the third path (3), the messaging and operations described with reference to the fourth path (4) and the fifth path (5) may be waived (e.g., omitted), and the network component 129 (e.g., the BGCF/TF) may perform operations and messaging as described below with reference to the a sixth path (6).

As indicated by the sixth path (6), the network component 129 (e.g., the BGCF/TF) may query the Tier 2 ENUM 177 of the second carrier, which may find the corresponding entry for the called number. A particular query message sent from the network component 129 to the Tier 2 ENUM 177 may include at least a portion of the Internet protocol address of the Tier 2 ENUM 177 to enable the particular query message to be routed to and received by the Tier 2 ENUM 177. An example of the particular query message sent to the Tier 2 ENUM 177, as shown in FIG. 1, is as follows:

$ORIGIN 3.8.0.0.6.9.2.3.6.4.1.e164enum.net
IN NAPTR 10 100 "u" "E2U+sip"
"!^.*$!sip:+14632960083@ims.mnc072.mcc302.3gppnetwork.org;user=phone!".

As indicated by a seventh path (7), the Tier 2 ENUM 177 may return (to the network component, e.g., the BGCF/TF) the appropriate name authority pointer (NAPTR) record for the called number, along with a gateway uniform resource identifier (URI) corresponding to the device or location where the second carrier wants to accept the call from the first carrier. The device or location where the second carrier wants to accept the call may include a session border controller (SBC), such as the SBC 179. The network component 129 (e.g., the BGCF/TF) may then proceed to forward call processing for the call to the second carrier through the I-SBC 134 to extend the call to the IPX-P network 165, as indicated by an eighth path (8). As indicated by a ninth path (9), the IPX-P network 165 routes the call to the second carrier's SBC and completes the IP call to the second user device 111 of the second carrier. Calls originating from the second carrier may similarly take advantage of the IPX-P network 165 to access the Tier 2 ENUM 131 of the first carrier so as to route calls to the first user device 102.

In some implementations, the functionality of the first carrier network 125 (e.g., the system 100) may be supported and executed by using a server, such as a first server that is included the first carrier network, a second server that is coupled to the first carrier network 125, or a combination thereof. The server may include a memory that includes instructions, and a processor that executes the instructions from the memory 141 to perform various operations that are performed by the server. The processor may be hardware, software, or a combination thereof. The server may include a network server, a router, a gateway, a switch, a media distribution hub, a signal transfer point, a service control point, a service switching point, a firewall, an edge device, a node, a computer, a mobile device, any other suitable computing device, or a combination thereof, as illustrative, non-limiting examples. To illustrate, the server may include or correspond to the first carrier private ENUM 133. Additionally or alternatively, the server may include or correspond to the network component 129. In some implementations, the server may be communicatively linked to the first carrier network 125, the IPX-P network 165, the second carrier network 175, any other network, any device in the system 100, or any combination thereof. Although the server is described as being included in or coupled to the first carrier network 125, the IPX-P network 165, the second carrier network 175, or both may also include at least one server.

In some implementations, the system 100 may include a database (not shown) that is configured to store and relay information that traverses the system 100, cache content that traverses the system 100, store data about each of the devices in the system 100 and perform any other typical functions of a database. In some implementations, the database may be connected to or reside within the first carrier network 125, the IPX-P network 165, the second carrier network 175, any other network, or a combination thereof. In some implementations, the database may serve as a central repository for any information associated with any of the devices and information associated with the system 100. Furthermore, the database may include a processor and memory or be connected to a processor and memory to perform the various operation associated with the database. In some implementations, the database may be connected to a server of the first carrier network 125, the first user device 102, the second user device 111, any devices in the system 100, any other device, any network, or any combination thereof.

The database may also store information and metadata obtained from the system 100, store metadata and other information associated with the first and second users 101, 110, store user profiles associated with the first and second users 101, 110, store device profiles associated with any device in the system 100, store communications traversing the system 100, store user preferences, store information associated with any device or signal in the system 100, store information relating to patterns of usage relating to the first and second user devices 102, 111, store any information obtained from any of the networks in the system 100, store historical data associated with the first and second users 101, 110, store device characteristics, store name server records for any entity in the system 100, store information associated with the private ENUM 133 of the first carrier, store information associated with the Tier 2 ENUM 131 of the first carrier, store information associated with the IPX Tier 1 ENUM 167, store information associated with the Tier 2 ENUM 177 of the second carrier, store information associated with calls made in the system 100, store information associated with ENUM triggers, store pointers to ENUMs, store IP addresses for ENUMs or other components in the system 100, store DNS records for any domain, store call processing information, store any of the information disclosed for any of the operations and functions disclosed for the system 100 herewith, store any information traversing the system 100, or any combination thereof.

Although FIG. 1 illustrates a specific example configuration of the various components of the system 100, the system 100 may include any configuration of the components, which may include using a greater or lesser number of the components. For example, the system 100 is illustratively shown as including a first user device 102, a second user device 111, a first carrier network 125, an IPX-P network 165, and a second carrier network 175. However, the system 100 may include multiple first user devices, multiple second user devices, multiple first communications networks, multiple IPX-P networks, multiple second carrier communications networks, or any number of any of the other components inside or outside the system 100. Furthermore, in some implementations, substantial portions of the functionality and operations of the system 100 may be performed by other networks and systems that may be connected to system 100.

The system 100 may provide for carrier ENUM-based routing for a first user device 102 of a first carrier network 125 to locate and connect with a second user device 111 of a second carrier network 175. For example, the system 100 and methods may at least enable the network component 129 to query the IPX Tier 1 ENUM 167 and to resolve the DN by communicating with the IPX DNS 199. The functionality provided by the system 100 and accompanying methods may result in dramatically improved and timely call termination as well as the advantages (e.g., data rate, cost of calling session, rich IP data) of an IP-IP connection.

Figure 3:
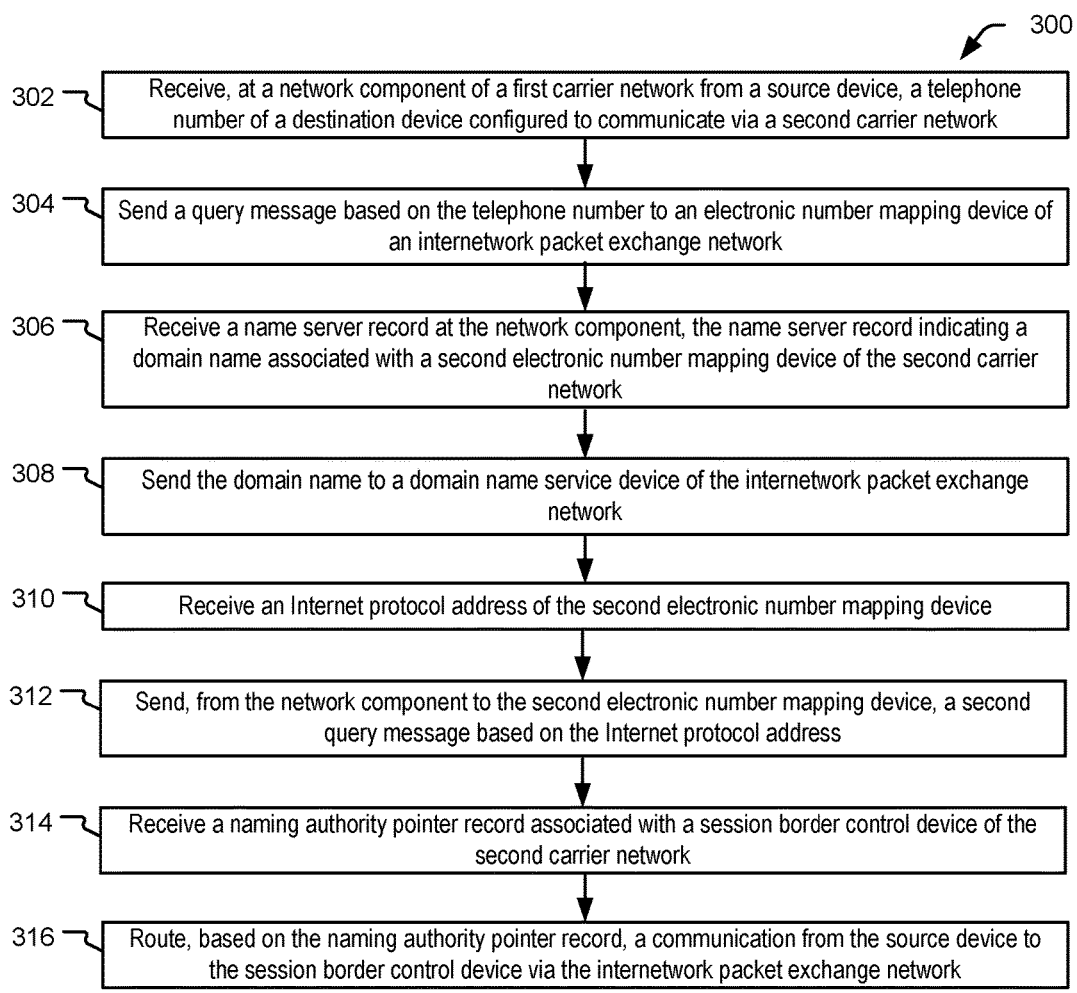
FIG. 3 is a flow diagram that illustrates a particular example of a method for enabling intercarrier communication.

Referring to FIG. 3 a flow diagram that illustrates an example of a method 300 for processing an IP session request is shown. For example, the illustrative method 300 may enable system having an architecture to perform IP carrier peering. To illustrate, the method 300 include steps for processing an IP based call (e.g., a VoLTE call) from a first subscriber of a first carrier to a second subscriber of a second carrier in accordance with the disclosure provided herein. The method 300 may be performed by a carrier network, such as the first carrier network 125 or the second carrier network 175 of FIG. 1. For example, the method 300 may be performed by the network component 129 of FIG. 2.

The method 300 includes receiving, at a network component of a first carrier network from a source device, a telephone number of a destination device configured to communicate via a second carrier network, at 302. The telephone number may include an E-164 number, as an illustrative, non-limiting example. The first carrier network and the source device may include or correspond to the first carrier network 125 and the first user device 102 of FIG. 1. The second carrier network and the destination device may include or correspond to the second carrier network 175 and the second user device 111 of FIG. 1. To illustrate, an Internet protocol multimedia subsystem (IMS) core device, such as a servicing-call session control function (S-CSCF), of the first carrier network may receive the telephone number via an access-session border controller (A-SBC) of the first carrier network. The telephone number may be associated with (or included in) a request to connect an IP call to the destination device.

The method 300 further includes sending a query message, based on the telephone number, to a telephone number mapping device of an internetwork packet exchange network, at 304. The query message may include at least a portion of the telephone number. In some implementations, the query message may include the telephone number (or a reverse version thereof) having a particular domain, such as an Intercarrier ENUM apex domain of "e164enum.net", as an illustrative, non-limiting example. The telephone number mapping device of the internetwork packet exchange network may include or correspond to the IPX Tier 1 ENUM 167 of the IPX-P network 165 of FIG. 1. The internetwork packet exchange network may be configured to maintain name server (NS) record(s) of Tier 2 ENUMS of multiple carrier providers, such as a first carrier provider of the first carrier network and a second carrier provider of the second carrier network. In some implementations, the network component may include a BGCF/TF that is configured to send the query message the internetwork packet exchange network.

The method 300 further includes receiving a name server record at the network component, the name server record indicating a domain name associated with a second telephone number mapping device of the second carrier network, at 306. The name server record may be received in response to the query message. The second telephone number mapping device of the second carrier network may include or correspond to the Tier 2 ENUM 177 of the second carrier network 175 of FIG. 1.

The method 300 includes sending the domain name to a domain name server of the internetwork packet exchange network, at 308. For example, the domain name server of the internetwork packet exchange network may include or correspond to the IPX DNS 199 of the IPX-P network 165 of FIG. 1. The method 300 further includes receiving an Internet protocol address of the second telephone number mapping device, at 310. The Internet protocol address may be received in response to the domain name sent to the domain name server of the internetwork packet exchange network.

The method 300 further includes sending, from the network component to the second telephone number mapping device, a second query message based on the Internet protocol address, at 312. The second query message may include at least a portion of the Internet protocol address. For example, the second query message may include the Internet protocol address (or a portion or version thereof) as a destination address of the second query to enable the second query message to be routed and delivered the second telephone number mapping device.

The method 300 also includes receiving a naming authority pointer record associated with a session border control device of the second carrier network, at 314. The naming authority pointer may be received in response to the second query message. In some implementations, in addition to the naming authority pointer record, the network component may receive a gateway uniform resource identifier for a particular device to accept a call on behalf of the second carrier. For example, the naming authority pointer record may include the gateway uniform resource identifier of the particular device, such as a session border control device (e.g., the SBC 179 of FIG. 1). To illustrate, the naming authority pointer record may include a gateway uniform resource identifier that identifies where the second carrier is willing to accept calls from the first carrier.

The method 300 further includes routing, based on the naming authority pointer record, a communication from the source device to the particular device (e.g., the session border control device) via the internetwork packet exchange network, at 316. Routing the call to the particular device of the second carrier network may enable the IP session (e.g., the IP call) to be connected to the destination device (e.g., second user device 111).

In some implementations, prior to sending the query message from the network component to the telephone number mapping device of the internetwork packet exchange network, the network component may receive the indication in response to the network component sending the third query message based on the telephone number to the third telephone number mapping device of the first carrier network. For example, the third telephone number mapping device may include or correspond to the first carrier private ENUM 133 of FIG. 1. The third query message may be associated with a first domain, such as a particular domain of the first carrier. Additionally or alternatively, the query message may be associated with a second domain. The second domain may include an intercarrier telephone number mapping apex domain.

The method 300 may include receiving an indication from a third telephone number mapping device (of the first carrier network) that the third telephone number mapping device failed to identify a telephone number entry corresponding to the telephone number. In some implementations, the network component may receive the indication responsive to the third query message. The indication may notify the network component that the third telephone number mapping device that the third telephone number mapping device failed to identify a telephone number entry corresponding to the telephone number.

If the indication notifies the network component that the telephone number entry is located, the destination device be a subscriber device of the first carrier. If so, the method may include, performing a DNS lookup to resolve the domain name to an IP address within the first carrier network. Once the domain name is resolved to the IP address, the destination device may be connected to the IP call based on the IP address.

Alternatively, if the indication notifies the network device that the telephone number entry failed to be identified, the method 300 may include generating the query message in response to reception of the indication. The query message may be associated with the second domain that is distinct from the first domain. In some implementations, to generate the query, the method 300 may include modifying the third query to generate a fourth query having a domain that is different from the third query. For example, the third query message may be associated with a first domain, such as an apex domain of "e164.arpa". The network component may convert the telephone number to a second domain, such as an intercarrier ENUM apex domain of "e164enum.net", that is distinct from the first domain. The converted telephone number may be included in the fourth query message. The network component may send the fourth query to the telephone number mapping of the first carrier. In response to the fourth query, the method 300 may include receiving a record associated with an internet protocol address of the telephone number mapping device of the internetwork packet exchange network. The query message may be generated based on the Internet protocol address of the telephone number mapping device of the internetwork packet exchange network. For example, the query message may include at least a portion of the Internet protocol address.

In some implementation, the method 300 may include, in response to the network component sending the query message to the telephone number mapping device of the internetwork packet exchange network, receiving an A record associated with the second telephone number mapping device of the second carrier network. The A record may include or indicate an IP address of the second telephone number mapping device. In response to receiving the A record, the network component may send a particular query message based on the A record to the second telephone number mapping device. The particular query message may include or correspond to the second query message sent from the network component to the second electronic number mapping device. The particular query message may be sent from the network component without sending the domain name to the domain name server of the internetwork packet exchange network, without receiving the Internet protocol address of the second telephone number mapping device from the domain name server, or a combination thereof. For example, in response to receiving the A record, the network component may waive (e.g., omit) performing one or more operations associated with sending the domain name to the domain name server or receiving the Internet protocol address of the second telephone number mapping device from the domain name server.

Thus, the method 300 illustrates carrier ENUM-based routing for a source device of a first carrier network to locate and connect with a destination device (e.g., of the second carrier network). The method 300 may at least enable the first carrier network (e.g., the network component) to query the telephone number mapping device of the internetwork packet exchange network and to resolve the domain name by communicating with the domain server of the internetwork packet exchange network. The functionality provided by the method 300 may result in improved and timely call termination as well as the advantages (e.g., data rate, cost of calling session, rich IP data) of an IP-IP connection.

Figure 4:
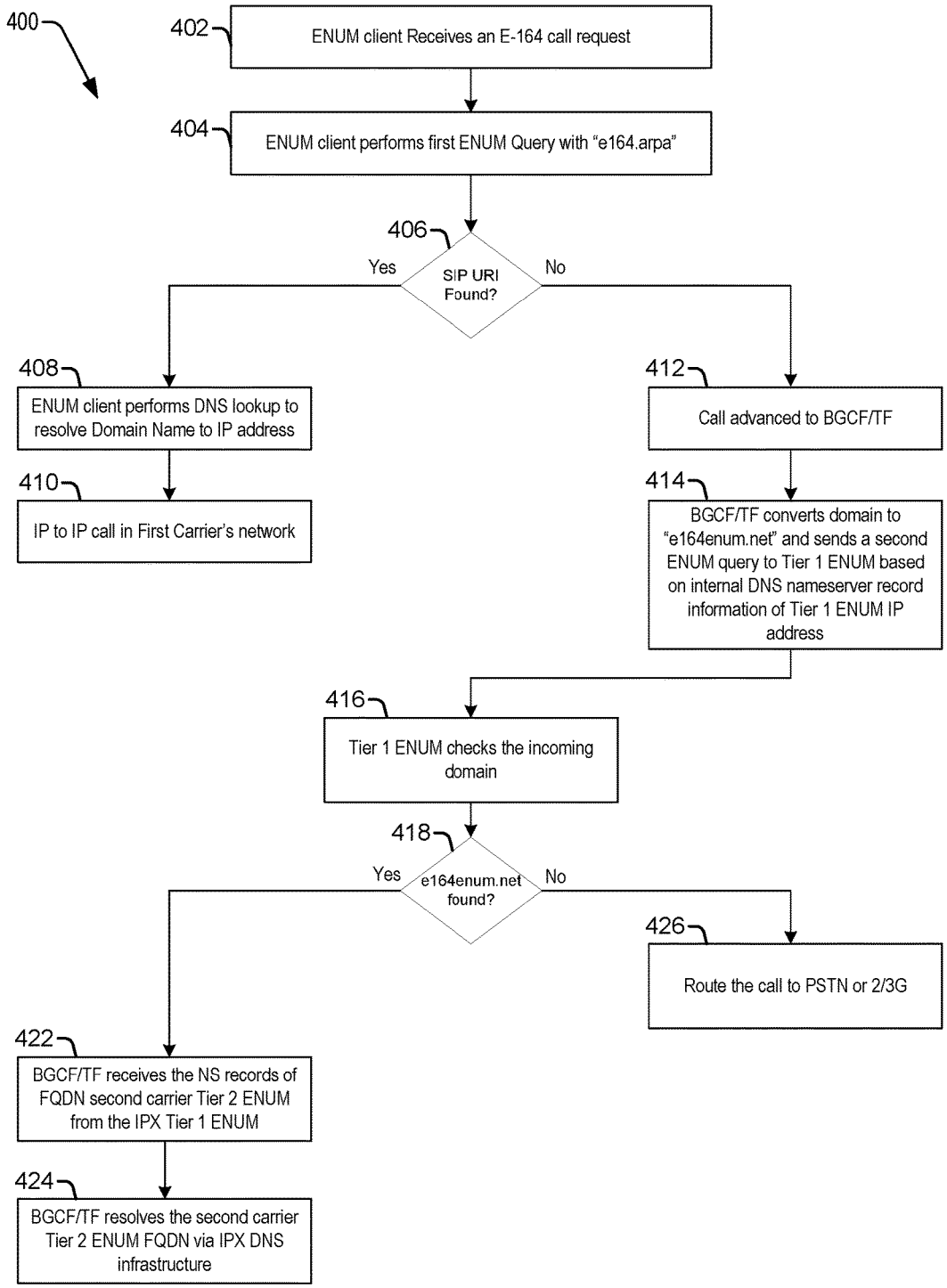
FIG. 4 is a flow diagram that illustrates another particular example of a method for enabling intercarrier communication.

Referring to FIG. 4, an illustrative method 400 for processing an IP-based communication session (e.g., an IP-based call) is depicted. The method 400 may illustrate a sequence of operation that may be utilized for processing an IP-based communication session, such as a VoLTE call, from a first subscriber (e.g., first user 101) of the first carrier to a second subscriber of the first carrier or to a second subscriber of a second carrier (e.g., second user 110). The method may be performed by one or more devices of a network, such as the first carrier network 125 or the second carrier network 175. For example, the method 400 may be performed by the network component 129, the private ENUM 133 of the first carrier, the first carrier network 125, a server included in or coupled to the first carrier network 125 of FIG. 1, any combination thereof, or by utilizing any other appropriate program, system, or device.

The method 400 may include, at 402, receiving, from the first user 101, an IP session request (e.g., an IP call) intended for either a second subscriber of the first carrier or the second user 110 of the second carrier. For example, the IP call may be a request to connect the first user 101 to the second subscriber of the first carrier or the second user 110 of the second carrier. In some implementations, the call may be received by an ENUM client, such as the first carrier, and the call may include an E-164 request. In some implementations, the IP call may be received from and by utilizing the first user device 102, the first carrier network 125, the network component 129, a server, any combination thereof, or by utilizing any other appropriate program, system, or device.

At 404, the method 400 may include having the ENUM client perform a first ENUM query using a domain, such as "e164.arpa", associated with the first carrier. At 406, the method 400 may include determining, based on the first ENUM query, whether a session initiation protocol uniform resource identifier (SIP URI) or other identifier is stored within a memory of the ENUM client. In some implementations, the determination may be performed by utilizing the first carrier network 125, a server of the first carrier network 125, any combination thereof, or by utilizing any other appropriate program, system, or device. If a SIP URI is able to be retrieved, then the second subscriber that is intended to receive the IP call from the first user 101 may also be a subscriber of the first carrier. If the second subscriber is a subscriber of the first carrier, the method 400 may include, at 408, having the ENUM client perform a DNS lookup to resolve a domain name to an IP address. Based on the IP address, the method 400 may then include, at 410, connecting and completing the call (e.g., IP-to-IP call) to the second subscriber within the first carrier network 125.

Alternatively, if, at 406, the SIP URI or other identifier cannot be retrieved based on the first query, the ENUM client may be unable to resolve the domain to an appropriate IP address to complete the call. Based on the foregoing, the method 400 may include, at 412, having the call request exit to the BGCF/TF of the first carrier.

Once the call request exits to the BGCF/TF of the first carrier, the method 400 may include, at 414, having the BGCF/TF convert the domain of the query to an intercarrier ENUM apex domain, such as, but not limited to, "e164enum.net". At 414, a modified query including the intercarrier ENUM apex domain may be sent to an IPX Tier 1 ENUM, such as the IPX Tier 1 ENUM 167, based on internal DNS name server (NS) record information that provides an IP address of the ENUM of the internetwork packet exchange network.

At 416, the Tier 1 ENUM may check and examine the new incoming intercarrier ENUM apex domain to determine which carrier the query should be sent to. At 418, the method 400 may include determining whether the telephone number of the intercarrier ENUM apex domain (e.g., "e164enum.net") has been found based on the querying. If telephone number of the intercarrier ENUM apex domain has been found based on the querying, the method 400 may include, at 422, receiving a name server (NS) record(s) of a fully qualified domain name (FQDN) second carrier Tier 2 ENUM at the BGCF/TF from the ENUM of the internetwork packet exchange network. The second carrier Tier 2 ENUM may include or correspond to the second carrier tier 2 ENUM 177 of FIG. 1. At 424, the method 400 may also include resolving, by the BGCF/TF, the second carrier Tier 2 ENUM FQDN via an IPX domain name server (DNS) infrastructure. For example, the IPX DNS infrastructure may include or correspond to the IPX DNS 199 of FIG. 1. As part of resolving the second carrier Tier 2 ENUM FQDN, the BGCF/TF may obtain an Internet protocol address of the second carrier Tier 2 ENUM.

In some implementations, the BGCF/TF may query the second carrier Tier 2 ENUM and the second carrier Tier 2 ENUM may return the appropriate name authority pointer (NAPTR) record for the called number, along with a gateway uniform resource identifier (URI) corresponding to the device or location where the second carrier wants to accept the call from the first carrier. The device or location where the second carrier wants to accept the call may include a session border controller (SBC). The BGCF/TF may forward the call (via the internetwork packet exchange network) to the second subscriber based on the NAPTR record, the URI, or both.

Alternatively, if, at 418, the intercarrier ENUM apex domain is not found based on the querying, then the call may not be an IP based call, and the call may be routed to a public switched telephone network (PSTN), a 2G network, a 3G network, another network, or any combination thereof, for delivery to the second subscriber at 426 of the method 400. In some implementations, the method 400 may further incorporate any of the features and functionality described for the system 100, the method 300, or as otherwise described herein.

The method 300 of FIG. 3, the method 400 of FIG. 4, or a combination thereof, may be initiated or controlled by an application-specific integrated circuit (ASIC), a processing unit, such as a central processing unit (CPU), a controller, another hardware device, a firmware device, a field-programmable gate array (FPGA) device, or any combination thereof. As an example, the method 300 of FIG. 3, the method 400 of FIG. 4, or a combination thereof, can be initiated or controlled by one or more processors. As an example, one or more of the methods of FIGS. 3-4, individually or in combination, may be performed by a processor associated with or included in the network component 129 of FIG. 1. To illustrate, a portion of one of the methods FIGS. 3-4 may be combined with a second portion of one of the methods of FIGS. 3-4. Additionally, one or more operations described with reference to the FIGS. 3-4 may be optional, may be performed at least partially concurrently, or may be performed in a different order than shown or described.

The systems and methods disclosed herein may include additional functionality and features. For example, in some implementations, the functionality and features provided by the systems and methods provide for a dynamic mechanism for providing carrier ENUM-based routing from one carrier to another IP peering partner. Additionally, the systems and methods enhance a carrier's position to offer competitive national and/or global IP services. Also, the systems and methods may assist in eliminating retries and delays, particularly when network disruptions and/or congestions occur. The systems and methods may further provide for improved service offerings, especially because availability plays an important role in convergent and/or multimedia services. Moreover, the systems and methods improve the efficiency of communication and enhance the flexibility of the IMS to reduce traffic delays and call flows. Notably, the functionality and features provided by the systems and methods take advantage of ENUM technologies being a basic foundation of global VoIP addressing to specific service provider domains and countries.

Figure 5:
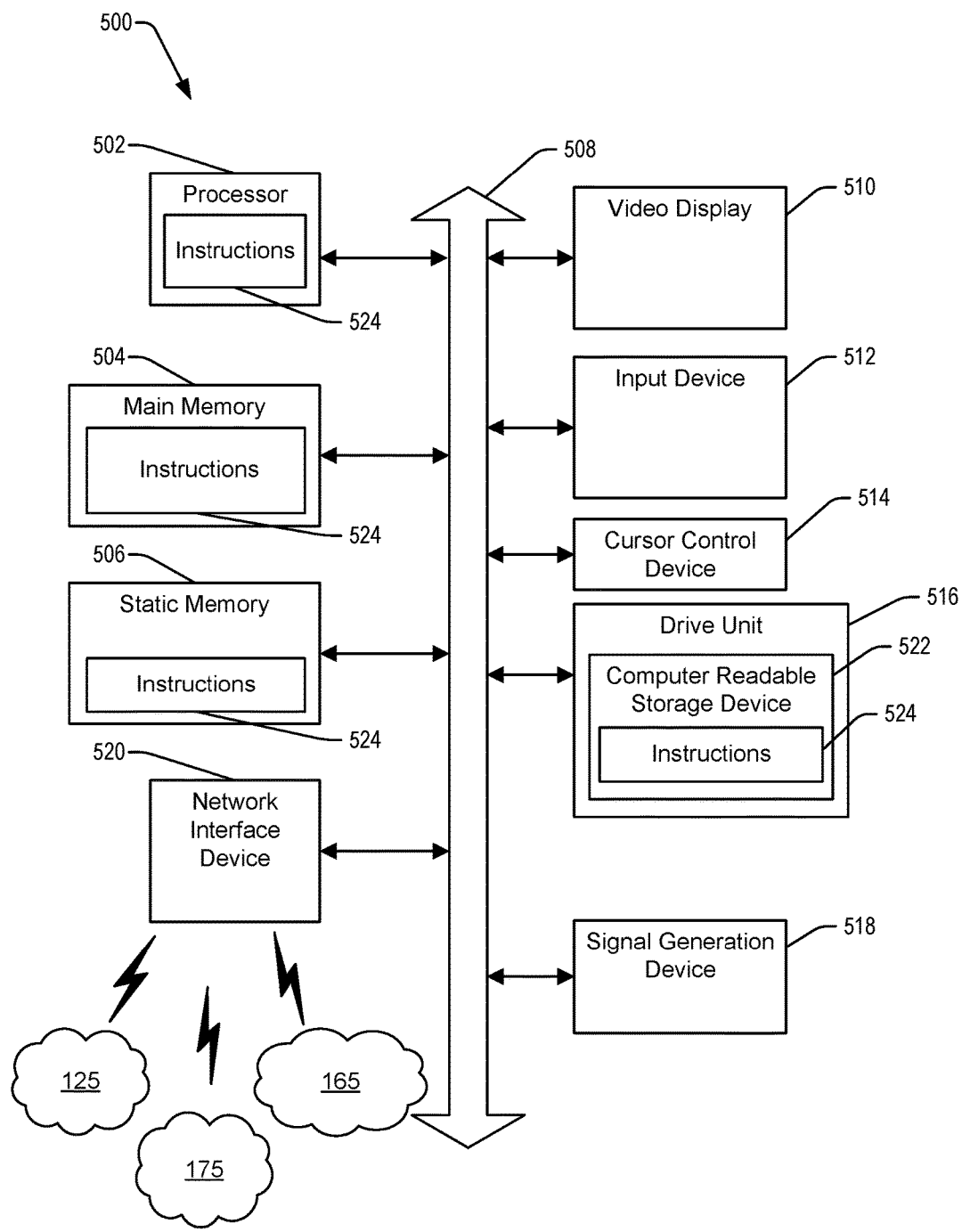
FIG. 5 is a schematic diagram of an illustrative example of a computer system within which a set of instructions, when executed, may cause the machine to perform any one or more of the methodologies or operations of the systems and methods for enabling intercarrier communication.

Referring to FIG. 5, at least a portion of the methodologies and techniques described with respect to the aspects of the system 100 can incorporate a machine, such as, but not limited to, computer system 500, or other computing device within which a set of instructions, when executed, may cause the machine to perform any one or more of the methodologies or functions discussed above. The machine may be configured to facilitate various operations conducted by the system 100, the method 300 of FIG. 3, the method 400 of FIG. 4, or a combination thereof. For example, the machine may be configured to, but is not limited to, assist the system 100 by providing processing power to assist with processing loads experienced in the system 100, by providing storage capacity for storing instructions or data traversing the system 100, or by assisting with any other operations conducted by or within the system 100.

In some implementations, the machine may operate as a standalone device. In some implementations, the machine may be connected (e.g., using first carrier network 125, IPX-P network 165, second carrier network 175, another network, or a combination thereof) to and assist with operations performed by other machines and systems, such as, but not limited to, the first user device 102, the second user device 111, the network component 129, the first carrier private ENUM 133, the first carrier tier 2 ENUM 131, a server associated with the first carrier network 125, or any combination thereof. The machine may be connected with any component in the system 100. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU), or both), a main memory 504 and a static memory 506, which communicate with each other via a bus 508. The computer system 500 may further include a video display unit 510, which may be, but is not limited to, a liquid crystal display (LCD), a flat panel, a solid state display, or a cathode ray tube (CRT). The computer system 500 may include an input device 512, such as, but not limited to, a keyboard, a cursor control device 514, such as, but not limited to, a mouse. In some implementations, the input device 512 and the cursor control device 514 may be integrated into a single device, such as a capacitive touch screen input device. The computer system 500 may also include a signal generation device 518, such as a speaker or remote control, and a network interface device 520. Some computer systems, such as the computer system 500, may not include an input device (e.g., a server may not include an input device).

The disk drive unit 516 may include a machine-readable medium 522 (e.g., a computer-readable storage device) on which one or more sets of instructions 524 is embedded. The computer-readable storage 522 may be random access memory (RAM), read-only memory (ROM), programmable read-only memory (PROM), erasable PROM (EPROM), electrically erasable PROM (EEPROM), register(s), solid-state memory, hard disk, a removable disk, a compact disc read-only memory (CD-ROM), other optical disk storage, magnetic disk storage, magnetic storage devices, or any other storage device that can be used to store program code in the form of instructions or data and that can be accessed by a computer and/or a processor. Computer-readable storage is not a signal. Further, the instructions 524 may embody one or more of the methods or logic as described herein. The one or more sets of instructions may include, but not limited to, software embodying any one or more of the methodologies or functions described herein, including those methods illustrated above, such as the method 300 of FIG. 3, the method 400 of FIG. 4, or a combination thereof. The instructions 524 may also reside, completely or at least partially, within the main memory 504, the static memory 506, or within the processor 502, or a combination thereof, during execution thereof by the computer system 500. The main memory 504 and the processor 502 also may constitute machine-readable media.

In an alternative implementation, dedicated hardware implementations, such as application specific integrated circuits, programmable logic arrays and other hardware devices, may be constructed to implement one or more of the methods described herein. Various implementations may include a variety of electronic and computer systems. One or more implementations described herein may implement functions using two or more specific interconnected hardware modules or devices with related control and data signals that can be communicated between and through the modules, or as portions of an application-specific integrated circuit (ASIC). Accordingly, the present system encompasses software, firmware, and hardware implementations.

In accordance with various aspects of the present disclosure, the methods described herein may be implemented by software programs executable by a computer system, a processor, or a device, which may include forms of instructions embodied as a state machine implemented with logic components in an ASIC or a field programmable gate array (FPGA) device. Further, in an illustrative, non-limiting example, implementations may include distributed processing, component/object distributed processing, and parallel processing. Alternatively, virtual computer system processing may be constructed to implement one or more of the methods or functionality as described herein. It is further noted that a computing device, such as a processor, a controller, a state machine or other suitable device for executing instructions to perform operations may perform such operations directly or indirectly by way of one or more intermediate devices directed by the computing device.

The present disclosure contemplates a machine-readable medium 522 (e.g., computer readable storage), such as a computer-readable storage device, including instructions 524 so that a device connected to the first carrier network 125, IPX-P network 165, second carrier network 175, another network, or a combination thereof, can send or receive voice, video or data, and communicate over the first carrier network 125, IPX-P network 165, second carrier network 175, another network, or a combination thereof, using the instructions. The instructions 524 may further be transmitted or received over the first carrier network 125, IPX-P network 165, second carrier network 175, another network, or a combination thereof, via the network interface device 520.

The present disclosure includes computer-readable storage 522 that stores instructions 524, so that a device connected to a network 125, 165, 175 may communicate voice, video or data over the network 125, 165, 175. While the computer-readable storage 522 is shown to be a single device, the computer-readable storage 522 may include a single device or multiple devices, such as a centralized or distributed database, and/or associated caches and servers that store one or more sets of instructions. The computer-readable storage 522 is capable of storing a set of instructions for execution by a processor to cause a computer system to perform any one or more of the methods or operations disclosed herein. For example, the computer-readable storage 522 may store instructions for execution by a processor to cause a computer system to perform the method 300 described with reference to FIG. 3, the method 400 described with reference to FIG. 4, or a combination thereof.

While the machine-readable medium 522 is shown to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium", "machine-readable device", or "computer-readable device" shall accordingly be taken to include, but not be limited to: memory devices, solid-state memories such as a memory card or other package that houses one or more read only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium", "machine-readable device", or "computer-readable device" may be non-transitory, and, in some implementations, may not include a wave or signal per se. Accordingly, the disclosure is considered to include any one or more of a machine-readable medium or a distribution medium, as listed herein and including art-recognized equivalents and successor media, in which the software implementations herein are stored.

In a particular illustrative, non-limiting example, the computer-readable storage 522 may include a solid-state memory such as embedded memory (or a memory card or other package that houses one or more non-volatile read-only memories). Further, the computer-readable storage 522 may be a random access memory or other volatile re-writable memory. Additionally, the computer-readable storage 522 may include a magneto-optical or optical device, such as a disk or tapes or other storage device. Accordingly, the disclosure is considered to include any one or more of a computer-readable storage device and other equivalents and successor devices, in which data or instructions may be stored.

Although the one or more components and functions may be described herein as being implemented with reference to particular standards or protocols, the disclosure is not limited to such standards and protocols. Such standards are from time-to-time superseded by faster or more efficient equivalents having essentially the same functions. Wireless standards for device detection, short-range communications, and long-range communications can be used by the computer system 500 in various implementations.

The illustrations of the aspects described herein are intended to provide a general understanding of the structure of the various aspects. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. Figures are also merely representational and may not be drawn to scale. Accordingly, the disclosure and the figures are to be regarded as illustrative rather than restrictive.

Although specific aspects have been illustrated and described herein, it should be appreciated that any subsequent arrangement designed to achieve the same or similar purpose may be substituted for the specific implementations shown. This disclosure is intended to cover any and all subsequent adaptations or variations of various aspects and various implementations.

Less than all of the operations or functions described with respect to the exemplary processes or methods can also be performed in one or more of the exemplary implementations. Further, the use of numerical terms to describe a device, component, operation or function, such as first, second, third, and so forth, is not intended to describe an order unless expressly stated. The use of the terms first, second, third and so forth, is generally to distinguish between devices, components, operations or functions unless expressly stated otherwise. Additionally, one or more devices or components described with respect to the exemplary implementations can facilitate one or more functions, where the facilitating (e.g., facilitating access or facilitating establishing a connection) can include less than every operations needed to perform the function or can include all of the operations needed to perform the function.

In one or more implementations, a processor (which can include a controller or circuit) has been described that performs various functions. It should be understood that the processor can be implemented as multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines (e.g., virtual servers), components such as microprocessors and storage devices may be virtualized or logically represented. The processor can include a state machine, an application specific integrated circuit, and/or a programmable gate array (PGA) including a FPGA. In one or more implementation, when a processor executes instructions to perform "operations", this can include the processor performing the operations directly and/or facilitating, directing, or cooperating with another device or component to perform the operations.

The Abstract is provided with the understanding that it will not be used to interpret or limit the scope or meaning of the claims. In addition, in the foregoing Detailed Description, various features may be grouped together or described in a single implementation for the purpose of streamlining the disclosure. This disclosure is not to be interpreted as reflecting an intention that the claims require more features than are expressly recited in each claim. Rather, as the following claims reflect, inventive subject matter may be directed to less than all of the features of any of the disclosed implementations. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other aspects, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An apparatus comprising:
a memory that stores instructions; and
a processor coupled to the memory, the processor configured to execute the instructions to cause the processor to perform operations including:
receiving, at a network component of a first carrier network from a source device, a telephone number of a destination device configured to communicate via a second carrier network;
receiving an indication from a first telephone number mapping device of the first carrier network that the first telephone number mapping device failed to identify a telephone number entry corresponding to the telephone number;
in response to the indication, receiving a name record server record indicating a domain name associated with a second telephone number mapping device of an internetwork packet exchange network;
in response to the domain name being sent from the network component to a domain name server, receive an Internet protocol address of the second telephone number mapping device;
generating a query message in response to receiving the indication based on the Internet protocol address of the second telephone number mapping device;
in response to the query message being sent from the network component to the second telephone number mapping device, receiving an A record associated with a third telephone number mapping device of the second carrier network; and
in response to receiving the A record, sending, from the network component to the third telephone number mapping device, a second query message based on the A record, wherein the second query message is sent without sending a second domain name corresponding to the third telephone mapping device to a domain name server of the internetwork packet exchange network.

2. The apparatus of claim 1, wherein the operations further include sending the query message from the network component to the second telephone number mapping device.

3. The apparatus of claim 1, wherein the operations further include, in response to the second query message, receiving a naming authority pointer record associated with a session border control device of the second carrier network.

4. The apparatus of claim 3, wherein the operations further include routing, based on the naming authority pointer record, a communication from the source device to the session border control device via the internetwork packet exchange network.

5. The apparatus of claim 1, wherein the operations further include, in response to the second query message, receiving a gateway uniform resource identifier for a particular device to accept a call on behalf of the second carrier network.

6. The apparatus of claim 1, wherein the operations further include, prior to the query message being sent to the second telephone number mapping device of the internetwork packet exchange network, sending a third query message based on the telephone number to a fourth telephone number mapping device of the first carrier network.

7. The apparatus of claim 6, wherein the third query message is associated with a first domain, and wherein the query message is associated with a second domain.

8. The apparatus of claim 7, wherein the first domain comprises a domain of the first carrier network, and wherein the second domain comprises an intercarrier telephone number mapping apex domain.

9. The apparatus of claim 6, wherein the operations further include, in response to the third query message, receiving an indication from the fourth telephone number mapping device that the fourth telephone number mapping device failed to identify a telephone number entry corresponding to the telephone number.

10. The apparatus of claim 9, wherein the operations further include generating the query message in response to reception of the indication, and wherein the query message includes the telephone number.

11. The apparatus of claim 1, wherein the operations further include:
generating a third query message having a first domain of the first carrier network; and
converting, based on a breakout gateway control function, the first domain of the third query message to include an intercarrier telephone number mapping apex domain.

12. The apparatus of claim 1, wherein the network component is a servicing-call session control function device.

13. A method comprising:
receiving, at a network component of a first carrier network from a source device, a telephone number of a destination device configured to communicate via a second carrier network;
receiving an indication from a first telephone number mapping device of the first carrier network that the first telephone number mapping device failed to identify a telephone number entry corresponding to the telephone number;
in response to the indication, receiving a name record server record indicating a domain name associated with a second telephone number mapping device of an internetwork packet exchange network;
in response to the domain name being sent from the network component to a domain name server, receive an Internet protocol address of the second telephone number mapping device;
generating a query message in response to receiving the indication based on the Internet protocol address of the second telephone number mapping device;
in response to the network component sending the query message being sent from the network component to the second telephone number mapping device, receiving an A record associated with a third telephone number mapping device of the second carrier network; and
in response to receiving the A record, sending, from the network component to the third telephone number mapping device, a second query message based on the A record, wherein the second query message is sent without sending a second domain name corresponding to the third telephone mapping device to a domain name server of the internetwork packet exchange network.

14. The method of claim 13, further comprising:
generating the second query message; and
in response to the second query message, receiving a naming authority pointer record associated with a session border control device of the second carrier network.

15. The method of claim 14, further comprising routing, based on the naming authority pointer record, a communication from the source device to the session border control device via the internetwork packet exchange network.

16. The method of claim 13, further comprising sending a third query message based on the telephone number to the first telephone number mapping device of the first carrier network prior to receiving the indication.

17. The method of claim 13, wherein the network component is a servicing-call session control function device.

18. A computer readable storage device comprising instructions executable by a processor to perform operations including:
receiving, at a network component of a first carrier network from a source device, a telephone number of a destination device configured to communicate via a second carrier network;
receiving an indication from a first telephone number mapping device of the first carrier network that the first telephone number mapping device failed to identify a telephone number entry corresponding to the telephone number;
in response to the indication, receiving a name record server record indicating a domain name associated with a second telephone number mapping device of an internetwork packet exchange network;
in response to the domain name being sent from the network component to a domain name server, receive an Internet protocol address of the second telephone number mapping device;
generating a query message in response to receiving the indication based on the Internet protocol address of the second telephone number mapping device;
in response to the network component sending the query message being sent from the network component to the second telephone number mapping device, receiving an A record associated with a third telephone number mapping device of the second carrier network; and
in response to receiving the A record, sending, from the network component to the third telephone number mapping device, a second query message based on the A record, wherein the second query message is sent without sending a second domain name corresponding to the third telephone mapping device to a domain name server of the internetwork packet exchange network.

19. The computer readable storage device of claim 18, wherein the operations further include, prior to sending the query message to the second telephone number mapping device of the internetwork packet exchange network:
sending a third query message to a telephone number mapping of the first carrier network for a record including the telephone number of the destination device;
modifying the third query message to generate a fourth query message having a domain that is different from the third query message; and
sending the fourth query message to the telephone number mapping of the first carrier network, wherein the name record server record is received in response to the fourth query message.

20. The computer readable storage device of claim 19, wherein the operations further include converting a first domain of the third query message to include an intercarrier telephone number mapping apex domain.

* * * * *